United States Patent [19]

Kato et al.

[11] Patent Number: 4,702,211
[45] Date of Patent: Oct. 27, 1987

[54] IGNITION TIMING CONTROL METHOD FOR INTERNAL COMBUSTION ENGINES

[75] Inventors: Akira Kato; Hisashi Igarashi, both of Tokyo; Tadashi Umeda, Asaka, all of Japan

[73] Assignee: Honda Giken Kogyo K.K., Tokyo, Japan

[21] Appl. No.: 819,502

[22] Filed: Jan. 15, 1986

[30] Foreign Application Priority Data

Jan. 21, 1985 [JP] Japan .................................. 60-7476

[51] Int. Cl.$^4$ ............................. F02P 5/14; F02P 5/15
[52] U.S. Cl. ....................................... 123/421; 123/416
[58] Field of Search ............... 123/416, 417, 418, 421, 123/424

[56] References Cited

U.S. PATENT DOCUMENTS 4,177,776 12/1979 Kauai et al. ..................... 123/421 X
4,419,974 12/1983 Nagase et al. ................... 123/421 X
4,421,085 12/1983 Nagase et al. ................... 123/421 X

FOREIGN PATENT DOCUMENTS 32061 2/1982 Japan .................................. 123/421

Primary Examiner—Tony M. Argenbright
Attorney, Agent, or Firm—Arthur L. Lessler

[57] ABSTRACT

An ignition timing control method for an internal combustion engine, which controls the ignition timing, on the basis of a basic ignition timing value determined as a function of operating parameters of the engine. When a detected parameter value indicative of engine temperature is lower than a predetermined value, a correction variable for the basic ignition timing value is determined based upon detected parameter values indicative of engine temperature and engine load magnitude, to correct the basic ignition timing value thereby. Ignition of the mixture is effected at a timing according to the corrected basic ignition timing value. Preferably, when detected engine rotational speed is lower than a predetermined value lower than the engine idling speed or when it is higher than a predetermined high rotational speed value, the correction of the basic ignition timing value by the correction variable is prohibited.

9 Claims, 5 Drawing Figures

IGNITION TIMING CONTROL METHOD FOR INTERNAL COMBUSTION ENGINES

BACKGROUND OF THE INVENTION

This invention relates to an ignition timing control method for an internal combustion engine, and more particularly to a method of this kind which controls the ignition timing of the engine when the engine is in a cold state.

A conventional method of controllng the ignition timing of an internal combustion engine has been proposed, e.g. by Japanese Patent Publication No. 50-37333, which comprises determining a basic ignition timing as a function of operating parameters of the engine, and correcting the basic ignition timing so as to advance by a correction value depending upon engine coolant temperature when the engine is cold, to thereby improve driveability of the engine in a cold state. However, according to the proposed ignition timing control method, the advance correction value is determined solely as a function of the engine coolant temperature, so that it is held at the same value so long as the engine coolant temperature remains constant, even if there occurs a change in another engine operating parameter such as the magnitude of engine load. As a result, a required advance of the ignition timing cannot be obtained when large output torque of the engine is desired, such as at engine acceleration from starting position. In order to avoid such inconvenience, if the advance correction value depending upon the engine coolant temperature is set to a value suitable for providing an ignition timing advance required for obtaining large engine output torque, such advance correction value provides an excessive advance of the ignition timing when the engine is operating under low load conditions, causing a drop in the exhaust gas temperature, which can result in degraded emission characteristics of the engine if the engine is provided with a catalyst purifying device due to a delayed increase of the catalyst bed temperature. Thus, the conventional method is not perfect enough to accurately control the ignition timing to values optimal for various operating conditions of the engine.

SUMMARY OF THE INVENTION

It is the object of the invention to provide an ignition timing control method for an internal combustion engine, which can control the ignition timing to values optimal for various operating conditions of the engine when the engine is in a cold state, to thereby improve driveability of the engine at acceleration from starting position, etc., as well as emission characteristics of same at low load conditions.

The present invention provides an ignition timing control method for an internal combustion engine, which is adapted to control the timing of ignition of a mixture being supplied to the engine, on the basis of a basic ignition timing value determined as a function of operating parameters of the engine. The method comprises the following steps: (a) detecting a parameter value indicative of a temperature of the engine; (b) detecting a parameter value indicative of the magnitude of load on the engine when the parameter value indicative of the temperature of the engine thus detected is lower than a predetermined value; (c) determining a correction variable based upon the parameter values indicative of the temperature of the engine and the magnitude of load on same thus detected; (d) correcting the basic ignition timing value by the correction variable thus determined; and (e) effecting ignition of the mixture at a timing according to the basic ignition timing value thus corrected.

Preferably, the rotational speed of the engine is detected. Execution of the steps (b)–(e) is prohibited when the rotational speed of the engine thus detected is lower than a predetermined value which is lower than the idling speed of the engine.

Preferably, the rotational speed of the engine is detected. Execution of the steps (b)–(e) is prohibited when the rotational speed of the engine thus detected is higher than a predetermined value of the rotational speed of the engine falling within a high engine speed region.

Preferably, the correction variable is set to a larger value for providing a greater advance of the ignition timing as the detected parameter value indicative of the magnitude of load on the engine shows a larger magnitude of the engine load, so long as the detected parameter value indicative of the engine temperature remains constant.

The above and other objects, features and advantages of the invention will be more apparent from the ensuing detailed description taken in conjunction with the accompanying drawings.

DETAILED DESCRIPTION OF THE INVENTION

An embodiment of the invention will now be described in detail with reference to the drawings.

Figure 1:
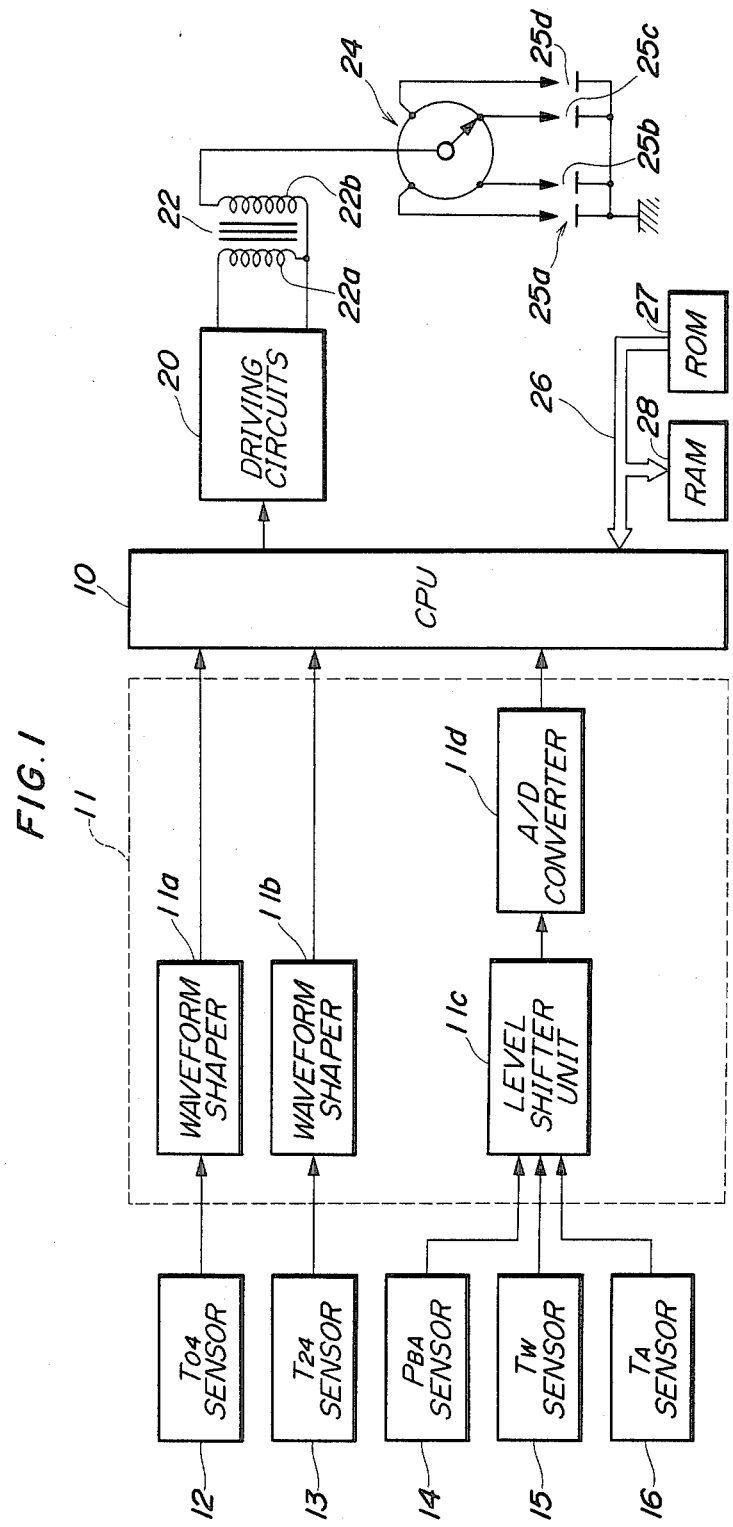
FIG. 1 is a block diagram showing the whole arrangement of an ignition timing control system of an internal combustion engine, to which the method of the invention is applied.

FIG. 1 shows a whole arrangement of an ignition timing control system of an internal combustion engine, to which the method of the invention is applied. The control system in FIG. 1 controls the ignition timing of the engine which may be a four cylinder type, for example. Reference numeral 10 designates a central processing unit (hereinafter called "the CPU") to which are connected various sensors at its input side via an input circuit 11.

To be specific, a T04 sensor 12 is arranged in facing relation to a camshaft, not shown, of the engine, to generate pulses as a T04 signal each indicative of a reference crank angle position of a respective cylinder, at a particular crank angle position before top-dead-center (TDC) point of the cylinder upon completion of the compression stroke, e.g. at a crank angle position 10 degrees before TDC. Thus, the T04 sensor generates one pulse of the T04 signal each time the engine crankshaft rorates through 180 degrees. The T04 sensor 12 is connected to the CPU 10 via a waveform shaper 11a of the input circuit 11. The waveform shaper 11a shapes the T04 signal pulses from the T04 sensor 12 into rectangular pulses Sa4, Sa2 . . . shown in FIG. 2(a), to supply the same rectangular pulses to the CPU 10. On the other hand, a T24 sensor 13 is arranged in facing relation to the camshaft, to generate twenty four pulses as a T24 signal at equal intervals each time the camshaft rotates through 360 degrees, i.e. each time a crankshaft of the engine, not shown, rotates through 720 degrees, that is, one T24 signal pulse through each crank angle of 30 degrees. The T24 sensor 13 is connected to the CPU 10 via a waveform shaper 11b which shapes the T24 pulses from the T24 sensor 13 into rectangular pulses S35, S40–S45, S20, S21 . . . [in FIG. 2(b)] and supplies the rectangular pulses to the CPU 10.

Further connected to the CPU via a level shifter unit 11c of the input circuit 11 and an analog-to-digital (A/D) converter 11d of same are an absolute pressure (PBA) sensor 14 which is disposed to detect absolute pressure (PBA) within an intake pipe, not shown, of the engine at a location downstream of a throttle valve, not shown, of same, an engine coolant temperature (TW) sensor 15 which is mounted on the main body of the engine in a manner embedded in the peripheral wall of an engine cylinder having its interior filled with cooling water, to detect engine coolant temperature (TW), and a sensor 16 for detecting intake air temperature (TA). Output signals from these sensors have their output voltage levels shifted to a predetermined level by the level shifter unit 11c, and then have their analog values converted into digital signals by the A/D converter 11d, to be supplied to the CPU 10.

Driving circuits 20 are connected to the CPU 10 at its output side, for supplying electric power to a primary coil 22a of a corresponding ignition coil 22 for energizing same for a period of time corresponding to the duration of an energization control signal [FIG. 2(c)], hereinafter referred to, supplied thereto from the CPU 10. A secondary coil 22b of the ignition coil 22 is connected to corresponding one of ignition plugs 25a–25d of engine cylinders, e.g. in the illustrated embodiment, third, fourth, second, and first cylinders, via a distributor 24.

Further connected to the CPU 10 via a bus 26 are a ROM 27 which stores a control program executed within the CPU 10, an Ne - PBA $\theta$ig table, a $\theta$TW - TW table, all hereinafter described, etc., and a RAM 28 which temporarily stores various calculated values from the CPU 10.

Figure 2:
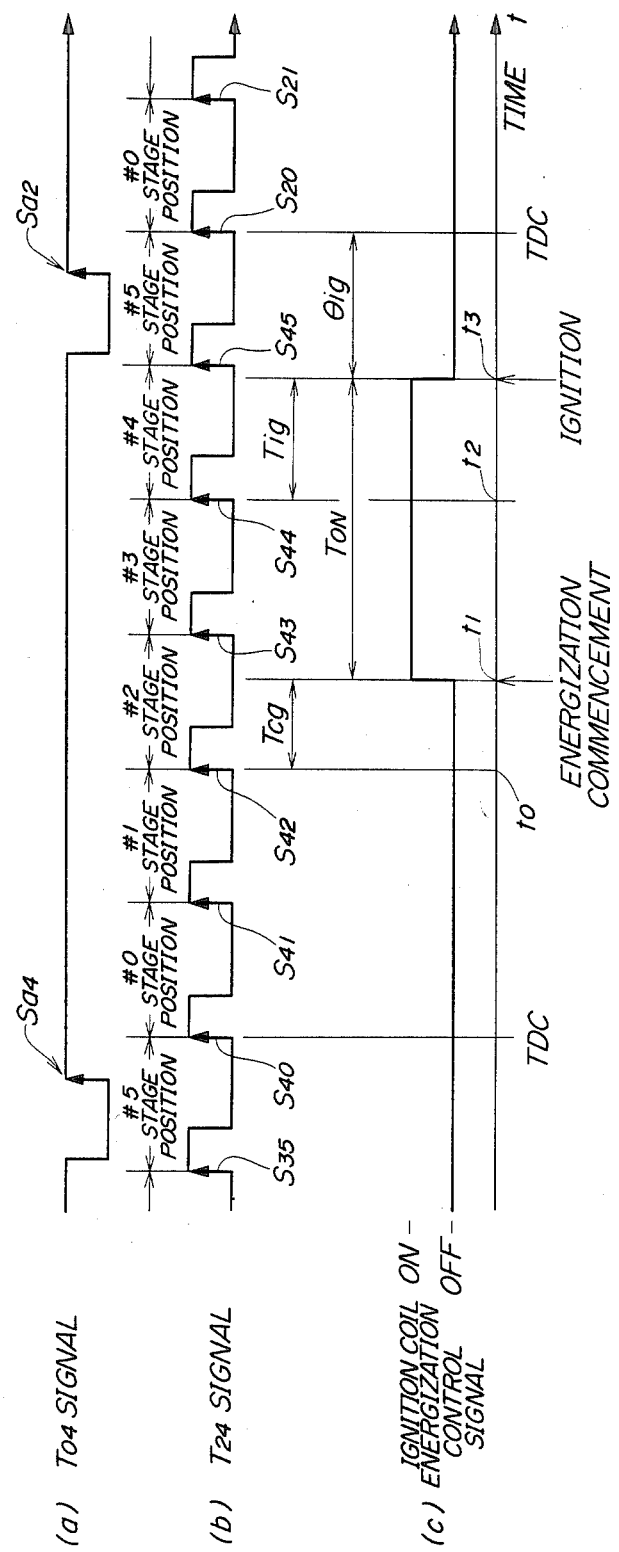
FIGS. 2(a–c) is a timing chart of pulses of a T04 signal an a T24 signal, respectively, from the T04 sensor and the T24 sensor both in FIG. 1, and pulses of a control signal from the CPU in FIG. 1 for energizing the ignition coil also appearing in FIG. 1.

Next, the operation of the ignition timing control system constructed as above will be described with reference to FIG. 2.

The CPU 10 operates to detect crank angle stages located between the reference crank angle position of each cylinder which is reached immediately before completion of a compression stroke and the reference crank angle position of the next cylinder within which spark ignition should be effected (the crank angle stages are hereinafter merely called "the stage positions"), on the basis of T04 signal pulses from the T04 sensor 12 as well as T24 signal pulses from the T24 sensor 13. That is, for example, let it be assumed that the T24 signal pulses S40 and S20 [FIG. 2(b)] which are inputted, respectively, immediately after generation of T04 signal pulses Sa4 and Sa2 [FIG. 2(b)] are generated at respective TDC positions upon completion of the compression stroke of the fourth cylinder and the second cylinder, as in the illustrated embodiment. Then, from generation of T04 signal pulse Sa4, the CPU 10 detects the reference crank angle position of the fourth cylinder, and from the T24 signal pulse S40 inputted immediately after the generation of the T04 signal pulse Sa4, it detects a #0 stage position (the time period between the leading edge of the T24 signal pulse S40, which is generated at TDC position in the embodiment, and that of the next T24 signal pulse S41 is defined as the #0 stage position. The other stage positons #1–#5 are likewise defined) precedent to the reference crank angle position of the second cylinder at which the T04 signal pulse Sa2 [FIG. 2(a)] is to be generated. Thereafter, the CPU 10 detects the #1, #2–#5 stage positions, respectively, from the T24 signal pulses S41, S42–S45 successively inputted thereto.

When a predetermined stage position, e.g. the #1 stage position, has been detected, the CPU 10 calculates ignition timing $\theta$ig, an energization period TON for the ignition coil 22 on the basis of the output signals from the above various parameter sensors. Calculation of the ignition timing $\theta$ig is made by the use of the following equation (1):

$$\theta ig = \theta igMAP + \theta TW + \theta CR \tag{1}$$

wherein the ignition timing $\theta$ig is expressed in terms of crank angle before a crank angle position (e.g. from TDC position) at which a T24 signal pulse, e.g. S20 [FIG. 2(b)], is generated immediately after a T04 signal pulse, e.g. Sa2 [FIG. 2(a)] indicative of the reference crank angle position of a cylinder, e.g. the second cylinder, within which ignition should be effected. $\theta$igMAP represents a basic ignition timing value which is determined as a fuction of the engine rotational speed (rpm) Ne and a parameter indicative of load on the engine, e.g., the absolute pressure PBA within the intake pipe detected by the PBA sensor 14. More specifically, as the basic ignition timing value $\theta$igMAP a value is read from the Ne - PBA $\theta$ig map stored in the ROM 27, which corresponds to detected values of the engine rotational speed Ne and the absolute pressure PBA. The engine rotational speed Ne is calculated each time a T24 signal pulse is generated, for instance, in a manner such that a value Me which is proportional to the reciprocal of the engine rotational speed Ne is obtained by counting clock pulses generated by a clock pulse generator, not shown, within the CPU 10 over a time interval between adjacent T24 signal pulses. $\theta$TW is a correction variable for the basic ignition timing value $\theta$igMAP, i.e. an advance correction value, which is applicable at cold operation of the engine, detailed description of which is given later. $\theta$CR represents other advance or retard correction values which are determined in dependence upon intake air temperature, etc.

Further, the CPU 10 calculates in terms of crank angle the energization period TON for the primary coil 22a of the ignition coil 22, which is set to an angle value optimal for preventing overheat of the coil 22 as well as misfire of the ignition plug 25. In general, it is determined as a function of the engine rotational speed Ne.

Then, the CPU 10 calculates a time period Tcg before starting energization of the primary coil 22a as well as a time period Tig before terminating energization of same, on the basis of the thus obtained angle values of ignition timing $\theta$ig and energization period TON. First, the CPU 10 calculates a crank angle position at which energization of the primary coil 22a should be started on the basis of the obtained angle values of the ignition timing $\theta$ig and energization period TON by calculating the sum of same backward from a TDC position immediately after the reference crank angle position of the second cylinder within which the ignition should be effected, i.e. a crank angle position corresponding to the time point t1 in FIG. 2(c). This is followed by determining which one of the stage positions (from #2 to #5) the calculated crank angle position falls under. In the illustrated embodiment, the crank angle position corresponding to the time point T1 falls under the stage position #2. Then, the CPU 10 calculates the time period Tcg before starting the energization as a period of time from the time point t0 [FIG. 2(c)] at which the T24 signal pulse S42 is inputted and the #2 stage position should begin, to the above time point t1, which period of time is required for the crankshaft to rotate through a corresponding crank angle until it assumes the crank angle position t1 at which the energization should be started. Similarly, in order to calculate the time period Tig before terminating the energization, the CPU 10 determines which one of the stage positions a crank angle position at which the energization should be terminated, i.e. a crank angle position corresponding to the time point t3 [FIG. 2(c)], falls under. In the illustraged embodiment, the crank angle position corresponding to the time point t3 falls under the stage position #4. Then, the time period Tig is calculated as a period of time from the time point t2 [FIG. 2(c)] at which the T24 signal pulse S44 is inputted and the #4 stage position should begin, to the above time point t3, which period of time is required for the crankshaft to rotate through a corresponding crank angle until it assumes the crank angle position t3 at which the energization of the primary coil 22a should be terminated.

From the time point (e.g. t0) at which the CPU 10 detects generation of a T24 signal pulse (e.g. S42) and accordingly the beginning of the stage position (e.g. #2) at which the energization of the coil 22a should be started, the CPU waits for the lapse of the time period Tcg by the use of an energization starting counter provided within the CPU. Immediately upon the lapse of the time period Tcg, the CPU 10 starts supplying the energization control signal to the driving circuit 20 at the time point t1. Then, from the time point (e.g. t2) at which the CPU 10 detects generation of a T24 signal pulse (e.g. S44) and accordingly the beginning of the stage position (e.g. #4) at which the energization should be terminated, it waits for the lapse of the time period Tig by the use of an energization terminating counter also provided within the CPU. Immediately upon the lapse of the time period Tig, the CPU 10 terminates supplying the energization control signal to the driving circuit 20 at time point t3.

The driving circuit 20 supplies electric power to the primary coil 22a of the ignition coil 22 to energize same for a period of time corresponding to the duration of the energization control signal from the CPU 10. When the electric power supply from the driving circuit 20 to the primary coil 22a is interrupted, high voltage is produced across the second coil 22b of the ignition coil 22, and supplied to the ignition plug (e.g. the ignition plug 25c) corresponding to a cylinder (e.g. the seocnd cylinder) within which spark should be discharged from the ignition plug 25c to effect ignition of the mixture.

Figure 3:
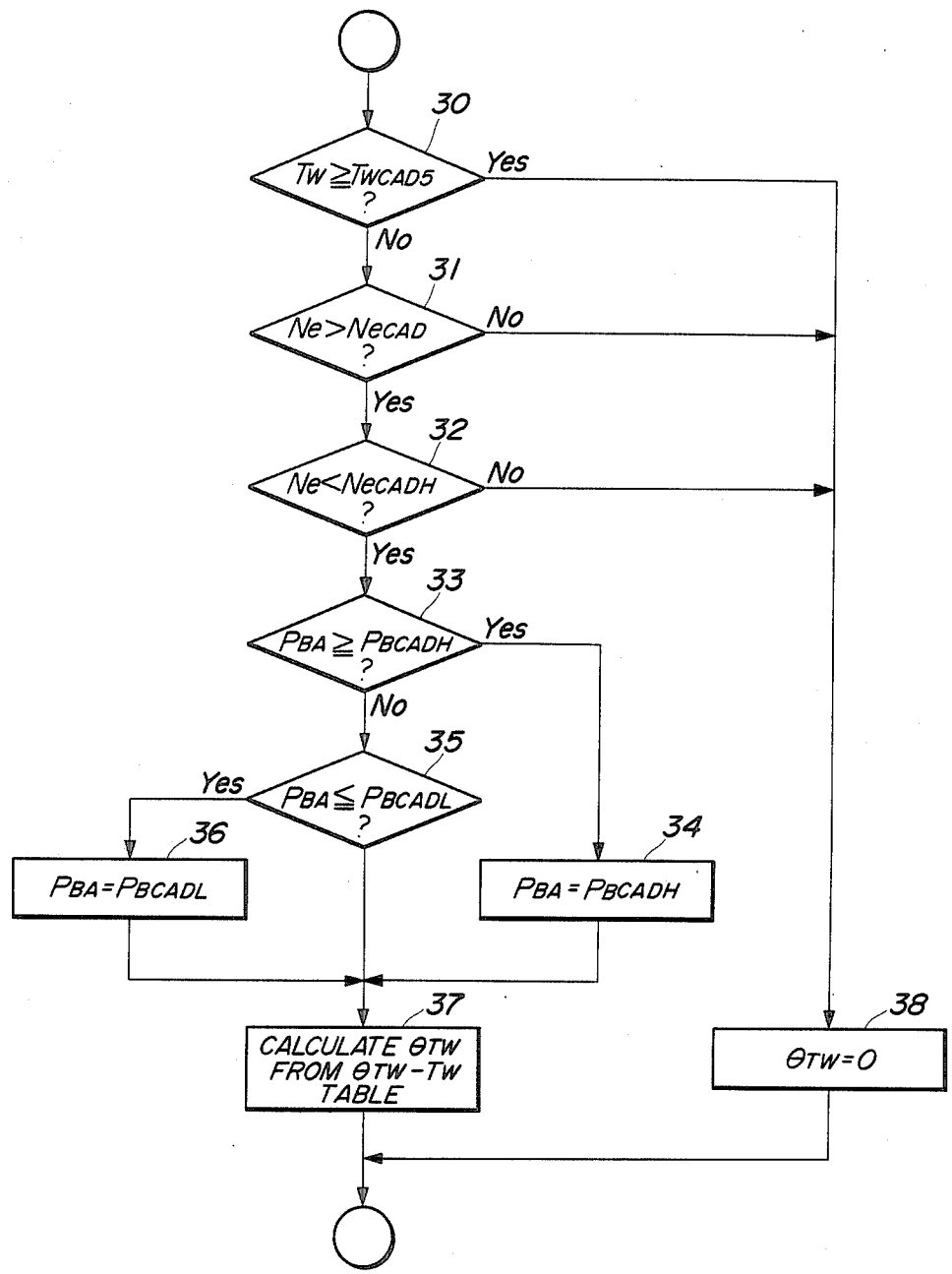
FIG. 3 is a flow chart showing a manner of determining the value of a correction variable OTW according to the invention.

FIG. 3 shows a manner of calculating the value of the correction variable $\theta$TW according to the invention, which is applicable during cold operation of the engine and executed within the CPU 10.

Figure 4:
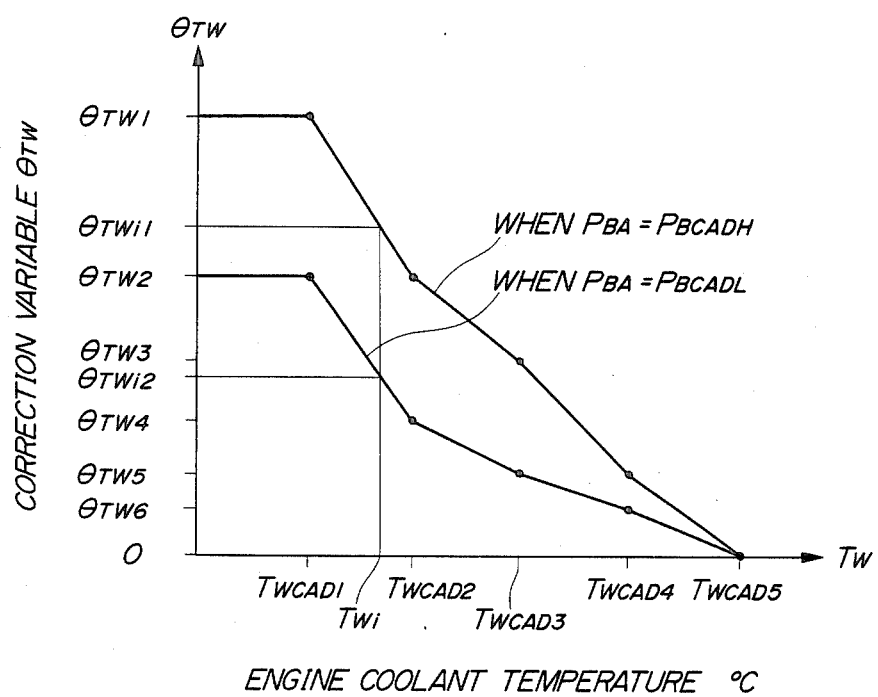
FIG. 4 is a graph showing tables of the relationship between the correction variable OTW and engine coolant temperature TW.

First, at the step 30, the CPU 10 determines whether or not the value of engine coolant temperature TW detected by the TW sensor 15 as the temperature of the engine is higher than a predetermined value TWCAD5 [FIG. 4], e.g. 80° C. If the answer to the question of the step 30 is yes, i.e. if the relationship of TW≧TWCAD5 stands, it is judged that it is not necessary to correct the basic ignition timing value $\theta$igMAP by the correction variable 0TW, and then, the CPU 10 executes the step 38 to set the value of the correction variable $\theta$TW to zero, followed by termination of execution of the program. On the other hand, if the answer at the step 30 is no, i.e. if the relationship of TW<TWCAD5 stands, the program proceeds to the step 31 wherein it is determined whether or not the engine rotational speed Ne is higher than a predetermined cranking speed NeCAD (e.g. 350 rpm). If the answer to the question of the step 31 is no, i.e. if the relationship of Ne≦NeCAD stands, it is judged that the engine is either in a cranking condition or in a very low speed operating condition, and then, the program proceeds to the above-mentioned step 38 to set the value of the correction variable $\theta$TW to zero, since, during such operating conditions of the engine, it is desired not to advance the ignition timing.

On the other hand, if the answer to the question of the step 31 is yes, i.e. if the relationship of Ne>NeCAD stands, then, the CPU 10 executes the step 32 wherein it is determined whether or not the engine rotational speed Ne is lower than a predetermined high speed NeCADH (e.g. 3000 rpm). If the answer at the step 32 is no, i.e. if the relationship of Ne≧NeCADH stands, the program proceeds to the above-mentioned step 38 to set the value of the correction variable $\theta$TW to zero, since, during such high speed operation of the engine, correction of the basic ignition timing value $\theta$igMAP by the use of the correction variable $\theta$TW can result in excessive advance of the ignition timing, which can cause knocking of the engine.

If the answer at the step 32 is yes, i.e. if both the relationships Ne>NeCAD and NE<NeCADH stand, the CPU 10 executes the steps 33 and 35 to determine whether or not absolute pressure PBA within the intake pipe detected by the PBA sensor 15 as a parameter indicative of the magnitude of load on the engine is within a range defined by a predetermined upper limit value and a predetermined lower limit value of the absolute pressure PBA. That is, while it is determined at the step 33 whether or not the detected absolute pressure value PBA is equal to or higher than the predetermined upper limit value PBCADH (e.g. 650 mmHg), it is determined at the step 35 whether or not the detected absolute pressure value PBA is equal to or lower than the predetermined lower limit value PBCADL (e.g. 310 mmHg). If both the steps 33 and 35 render negative answers, i.e. if the detected absolute pressure value PBA is within a range defined by the predetermined upper and lower limit values PBCADH and PBCADL, the program proceeds to the step 37, hereinafter described. On the other hand, if the answer at the step 33 is yes, i.e. if the detected value PBA is equal to or higher than the predetermined upper limit value PBCADH (PBA≧PBCADH), the CPU 10 executes the step 34 wherein the value of the absolute pressure value PBA is held at the predetermined upper limit value PBCADH, followed by execution of the step 37. If the answer at the step 35 is yes, i.e. if the detected value PBA is equal to or lower than the predetermined lower limit value PBCADL (PBA≦PBCADL), then, the CPU 10 executes the step 36 wherein the absolute pressure value PBA is held at the predetermined lower limit value PBCADL, followed by execution of the step 37.

At the step 37, the value of the correction variable $\theta TW$ is calculated by the use of a plurality of, e.g. two, $\theta TW$ - TW tables as shown in FIG. 4, which are stored in the ROM 27. In FIG. 4, the upper solid line indicates a first table which is used when the detected absolute pressure value PBA is equal to the predetermined upper limit value PBCADH, while the lower solid line indicates a second table which is used when the detected absolute pressure value PBA is equal to the predetermined lower limit value PBCADL. The first table and the second table comprise a plurality of, e.g. five predetermined correction variable values $\theta TW1-\theta TW3$, $\theta TW5$, and 0, and $\theta TW2$, $\theta TW4-\theta TW6$, and 0, respectively, which correspond, respectively, to a plurality of, e.g. five, predetermined engine coolant temperature values TWCAD1-TWCAD5. First, the CPU 10 calculates a first correction value $\theta TWi1$ corresponding to the predetermined upper limit value PBCADH and a second correction value $\theta TWi2$ corresponding to the predetermined lower limit value PBCADL, which correspond to the detected engine coolant temperature value TWi, by the use of respective ones of the first and second tables. More specifically, when the detected engine coolant temperature TWi is equal to one of the predetermined temperature values TWCAD1-TWCAD5, the CPU 10 reads the first and second correction values $\theta TWi1$ and $\theta TWi2$, respectively, from the first and second tables, which correspond to the one of the predetermined temperature values TWCAD1-TWCAD5. On the other hand, when the detected engine coolant temperature TWi is not equal to any one of the predetermined temperature values TWCAD1-TWCAD5, the CPU 10 calculates the first and second correction values $\theta TWi1$ and $\theta TWi2$ to values which correspond to the detected temperature TWi by means of an interpolation method. To be specific, while the first correction value $\theta TWi1$ is calculated by interpolation from two adjacent ones of the predetermined temperature values TWCAD1-TWCAD5 between which the detected engine coolant temperature TWi falls and corresponding two adjacent ones of the predetermined correction values in the first table, the second correction value $\theta TWi2$ is calculated by interpolation from the two adjacent ones of the predetermined temperature values TWCAD1-TWCAD5 and corresponding two adjacent ones of the predetermined ocrrection values in the second table.

Figure 5:
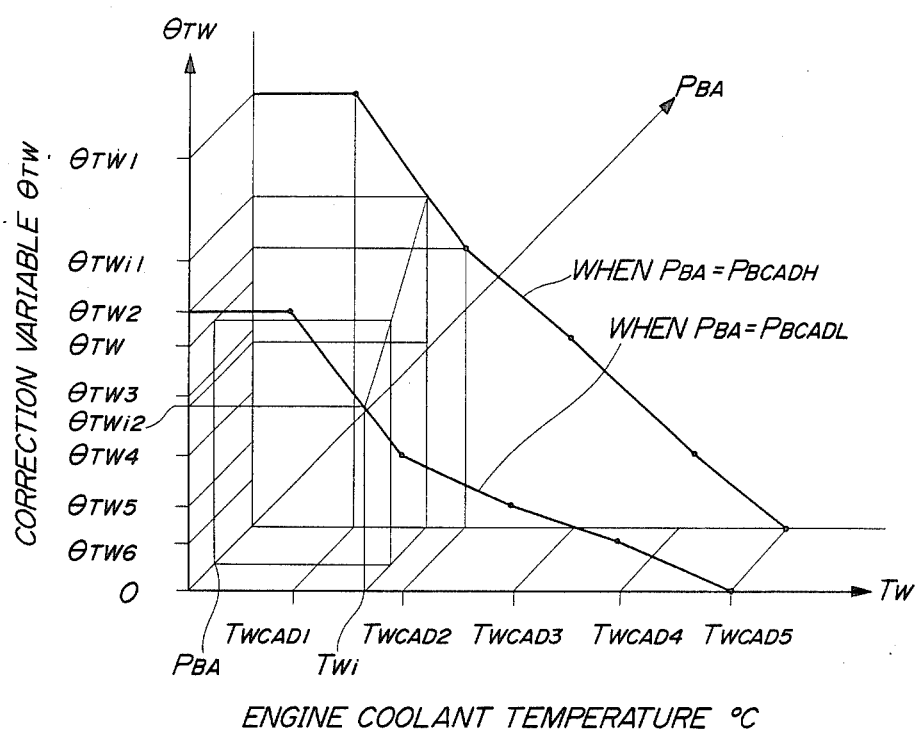
FIG. 5 is a graph showing how to calculate the value of the correction variable OTW by means of interpolation.

Then, the CPU 10 calculates the value of the correction variable $\theta TW$ on the basis of the first and second correction values $\theta TWi1$ and $\theta TWi2$ corresponding to the predetermined upper and lower limit values PBCADH and PBCADL and calculated as above by the use of the respective first and second tables. More specifically, when the absolute pressure value PBA is set to the predetermined upper limit value PBCADH at the step 34, and when it is set to the predetermined lower limit value PBCADL at the step 36, the value of the correction variable $\theta TW$ is set, respectively, to the first correction value $\theta TWi1$ and the second correction value $\theta TWi2$, at the step 37. On the other hand, when the detected absolute pressure value PBA falls within the range defined by the predetermined upper and lower limit values PBCADH and PBCADL, the value of the correction variable $\theta TW$ is calculated by means of interpolation from the first and second correction values $\theta TWi1$ and $\theta TWi2$, and the detected absolute pressure value PBA, as shown in FIG. 5. The thus obtained value $\theta TW$ is applied to the aforementioned equation (1) to calculate the ignition timing $\theta ig$. Incidentally, FIGS. 4 and 5 show calculation of the correction variable $\theta TW$ which is applied when the detected engine temperature TW has a value TWi falling between the predetermined temperature values TWCAD1 and TWCAD2, for example.

As stated above, to determine the value of the correction variable $\theta TW$, the ROM 27 stores only two $\theta TW$ - TW tables corresponding to the predetermined upper and lower limit values PBCADH and PBCADL, and the value of correction variable $\theta TW$ corresponding to the detected absolute pressure value PBA is calculated from the first and second correction values $\theta TWi1$ and $\theta TWi2$ calculated by the use of the two tables, either by directly reading them or by calculating through an interpolation method, thereby reducing required memory capacity of the ROM 27. Further, the provision of the predetermined upper and lower limit values PBCADH and PBCADL for the absolute pressure value PBA for determining the correction variable $\theta TW$ prevents that the value of the correction variable $\theta TW$ applied to the equation (1) makes the resulting value of the ignition timing $\theta ig$ excessively large or excessively small.

Incidentally, although in the foregoing embodiment of the invention, a plurality of, e.g. two $\theta TW$ - TW tables are used to calculate the value of the correction variable $\theta TW$, this is not limitative, but the value of the correction variable $\theta TW$ may be calculated by the use of a $\theta TW$ - TW - PBA table stored in the ROM 27.

Further, although in the foregoing embodiment, the value of the correction variable $\theta TW$ is determined based upon the absolute pressure PBA within the intake pipe as a parameter indicative of the magnitude of load on the engine, this is not limitative, but the value $\theta TW$ may be calculated based upon another parameter indicative of the magnitude of load on the engine, such as intake air quantity and throttle valve opening.

As described above, according to the ignition timing control method of the invention, the basic ignition timing value $\theta igMAP$ determined as a function of operating parameters of the engine, e.g. the rotational speed Ne of the engine and the intake pipe absolute pressure PBA, is corrected by the correction variable $\theta TW$ which is determined based upon the engine temperature TW and a parameter value indicative of the magnitude of load on the engine, e.g. the intake pipe absolute pressure PBA. Therefore, according to the method of the invention, when the engine is in a cold state, it is feasible to advance the ignition timing of the engine even to the most advanced value when large output torque of the engine is required, such as in high load operation of the engine and at acceleration from starting position, to thereby improve the driveability of the engine such as startability and accelerability. On the other hand, it is also feasible to retard the ignition timing to such an extent that the driveability of the engine is not spoiled when large output torque of the engine is not required, such as in low load operation of the engine, to thereby improve the emission characteristics of the engine through increasing the exhaust gas temperature and accordingly promptly increasing the catalyst bed temperature to an activation level of the catalyst.

What is claimed is:

1. An ignition timing control method for an internal combustion engine, which is adapted to control the timing of ignition of a mixture being supplied to said engine, on the basis of a basic ignition timing value determined as a function of operating parameters of said engine, the method comprising the steps of:
    (a) detecting a parameter value indicative of a temperature of said engine;
    (b) detecting a parameter value indicative of the magnitude of load on said engine when said parameter value indicative of the temperature of said engine thus detected is lower than a predetermined value;
    (c) determining a correction variable based upon said parameter values indicative of the temperature of said engine and the magnitude of load on same thus detected;
    (d) correcting said basic ignition timing value by said correction variable thus determined;
    (e) effecting ignition of said mixture at a timing according to said basic ignition timing value thus corrected;
    (f) detecting the rotational speed of said engine; and
    (g) prohibiting execution of said steps (b)–(e) when the rotational speed of said engine thus detected is lower than a predetermined value which is lower than the idling speed of said engine.

2. A method as claimed in claim 1, further including the step of (h) prohibiting execution of said steps (b)–(e) when the detected rotational speed of said engine is higher than a predetermined value of the rotational speed of said engine falling within a high engine speed region.

3. An ignition timing control method for an internal combustion engine, which is adpated to control the timing of ignition of a mixture being supplied to said engine, on the basis of a basic ignition timing value determined as a function of operating parameters of said engine, the method comprising the steps of:
    (a) detecting a parameter value indicative of a temperature of said engine;
    (b) detecting a parameter value indicative of the magnitude of load on said engine when said parameter value indicative of the temperature of said engine thus detected is lower than a predetermined value;
    (c) determining a correction variable based upon said parameter values indicative of the temperature of said engine and the magnitude of load on same thus detected;
    (d) correcting said basic ignition timing value by said correction variable thus determined;
    (e) effecting inigition of said mixture at a timing according to said basic ignition timing value thus corrected;
    (f) detecting the rotational speed of said engine; and
    (g) prohibiting execution of said steps (b)–(e) when the rotational speed of said engine thus detected is higher than a predetermined value of the rotational speed of said engine falling within a high engine speed region.

4. An ignition timing control method for an internal combustion engine, which is adapted to control the timing of ignition of a mixture being supplied to said engine, on the basis of a basic ignition timing value determined as a function of operating parameters of said engine, the method comprising the steps of:
    (a) detecting a parameter value indicative of a temperature of said engine;
    (b) detecting a parameter value indicative of the magnitude of load on said engine when said parameter value indicative of the temperature of said engine thus detected is lower than a pretermined value;
    (c) determining a correction variable based upon said parameter values indicative of the temperature of said engine and the magnitude of load on same thus detected, said correction variable being set to a larger value for providing a greater advance of the ignition timing as said detected parameter value indicative of the magnitude of load on said engine shows a larger magnitude of engine load, so long as said detected parameter value indicative of said engine temperature remains constant;
    (d) correcting said basic ignition timing value by said correction variable thus determined; and
    (e) effecting ignition of said mixture at a timing according to said basic ignition timing value thus corrected.

5. An ignition timing control method for an internal combustion engine having an intake passage, which method is adapted to control the timing of ignition of a mixture being supplied to said engine, on the basis of a basic ignition timing value determind as a function of operating parameters of said engine, the method comprising the steps of:
    (a) detecting a parameter value indicative of a temperature of said engine;
    (b) detecting the absolute pressure within said intake passage, said pressure being indicative of the magnitude of load on said engine, when said parameter value indicative of the temperature of said engine thus detected is lower than a predetermined value;
    (c) determining a correction variable based upon said parameter values indicative of the temperature of said engine and the magnitude of load on same thus detected, said correction variable being set to a larger value for providing a greater advance of the ignition timing as said detected parameter value indicative of the magnitude of load on said engine show a larger magnitude of engine load, so long as said detected parameter value indicative of said engine temperature remains constant;
    (d) correcting said basic ignition timing value by said correction variable thus determined; and
    (e) effecting ignition of said mixture at a timing according to said basic ignition timing value thus corrected.

6. An ignition timing control method for an internal combustion engine having an intake passage, which method is adapted to control the timing of ignition of a mixture being supplied to said engine, on the basis of a basic ignition timing value determined as a function of operating parameters of said engine, the method comprising the steps of:
    (a) detecting a parameter value indicative of a temperature of said engine;
    (b) detecting the absolute pressure within said intake passage, said pressure being indicative of the magnitude of load on said engine when said parameter value indicative of the temperature of said engine thus detected is lower than a predetermiend value;
    (c) determining a correction variable based upon said parameter values indicative of the temperature of said engine and the magnitude of load on same thus detected by the steps of:

(i) prestoring a first correction value group which comprises a plurality of correction values corresponding to respective different engine temperatures and to a predetermined upper limit value of said absolute pressure within said intake passasge, and a second correction value group which comprises a plurality of correction values smaller than respective corresponding ones of said correction values of said first correction value group and corresponding to said respective different engine temperatures and to a predetermined lower limit value of said absolute pressure within said intake passage;

(ii) determining whether or not said absolute pressure within said intake passage detected at said step (b) falls within a range defined by said predetermined upper limit value and said predetermined lower limit value;

(iii) reading a first correction value and a second correction value, respectively, from said first correction value group and from said second correction value group, said first and second correction values corresponding to said parameter value indicative of said engine temperature detected at said step (a); and (iv) calculating said correction variable by interpolation on the basis of said first and second values thus read as well as said detected absolute pressure within said intake passage;

(d) correcting said basic ignition timing value by said correction variable thus determined; and (e) effecting ignition of said mixture at a timing according to said basic ignition timing value thus corrected.

7. A method as claimed in claim 6, wherein when it is determined that said detected absolute pressure is equal to or higher than said predetermined upper limit value, said correction variable is set to said first correcton value which is read from said first correction value group as corresponding to said detected engine temperature.

8. A method as claimed in claim 6, wherein when it is determined that said detected absolute pressure is equal to or lower than said predetermined lower limit value, said correction variable is set to said second correction value which is read from said second correction value group as corresponding to said detected engine temperature.

9. A method as claimed in claim 6, wherein said correction variable is set to a larger value for providing a greater advance of the ignition timing as said detected parameter value indicative of the magnitude of load on said engine shows a larger magnitude of engine load, so long as said detected parameter value indicative of said engine temperature remains constant.

* * * * *